(12) United States Patent
Smeltzer, III et al.

(10) Patent No.: US 6,367,844 B1
(45) Date of Patent: Apr. 9, 2002

(54) ATTACHMENT FITTING FOR PRESSURE VESSEL

(75) Inventors: Stanley S. Smeltzer, III, Smithfield, VA (US); Robert W. Carrigan, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/338,407

(22) Filed: Jun. 22, 1999

(51) Int. Cl.[7] ................................................. F16L 17/00
(52) U.S. Cl. ........................ 285/95; 285/351; 285/355
(58) Field of Search ................................. 285/206, 351, 285/355, 14, 93, 95

(56) References Cited

U.S. PATENT DOCUMENTS

| 2,630,339 | A | * | 3/1953 | Appleton | 285/206 |
| 3,177,014 | A | * | 4/1965 | Bergstrom | 285/206 |
| 4,682,797 | A | * | 7/1987 | Hildner | 285/40 |
| 4,771,828 | A | * | 9/1988 | Cassity | 285/95 |
| 6,193,284 | B1 | * | 2/2001 | King | 285/139.2 |

* cited by examiner

*Primary Examiner*—Teri Pham Luu
(74) *Attorney, Agent, or Firm*—Jerry L. Seemann

(57) ABSTRACT

This invention provides sealed access to the interior of a pressure vessel and consists of a tube, a collar, redundant seals, and a port. The port allows the seals to be pressurized and seated before the pressure vessel becomes pressurized.

5 Claims, 2 Drawing Sheets

ATTACHMENT FITTING FOR PRESSURE VESSEL

CROSS-REFERENCE TO A RELATED APPLICATION

This application is an original application and does not claim the benefit of any previously filed application.

STATEMENT REGARDING FEDERALLY-SPONSORED RESEARCH OR DEVELOPMENT

The invention described in this patent was made by employees of the United States Government and may be manufactured and used by or for the Government for governmental purposes without the payment of any royalties.

BACKGROUND OF THE INVENTION

1. Field of the Invention

In general, this invention pertains to access openings for pressure vessels. Specifically, this invention pertains to an apparatus for providing access to pressure vessels that can be used in conjunction with any material from which a pressure vessel is constructed.

Background Information

Pressure vessels can be fabricated from a variety of materials including traditional metal alloys or modern combinations of synthetic fiber and resins (i.e., composite materials). While composite materials offer higher strength/weight ratios than metal alloys, composite materials are much more difficult, if not impossible, to transform into complex shapes. For example, fabricating a pressure vessel to accommodate a pipe flange is fraught with much difficulty. Thus, special devices or fittings are needed to accommodate complex geometry in pressure vessels that are fabricated from composite materials.

SUMMARY OF THE INVENTION

This invention has the ability to provide sealed access to the interior of a pressure vessel. The novelty of this invention lies in its ability to be used in conjunction with any vessel material and its redundant seal configuration.

An object of this invention is to provide access to the interior of a pressure vessel.

Another object of this invention is to provide access to the interior of a pressure vessel that can be used in conjunction with any vessel material.

A further object of this invention is to accommodate the connection of pipelines to pressure vessels.

A still further object of this invention is to provide sealable access to the interior of a pressure vessel that has redundant sealing capabilities.

BRIEF DESCRIPTION OF THE DRAWINGS

The following discussion of the invention will refer to the accompanying drawings in which.

DESCRIPTION OF THE PREFERRED EMBODIMENT

Figure 1:
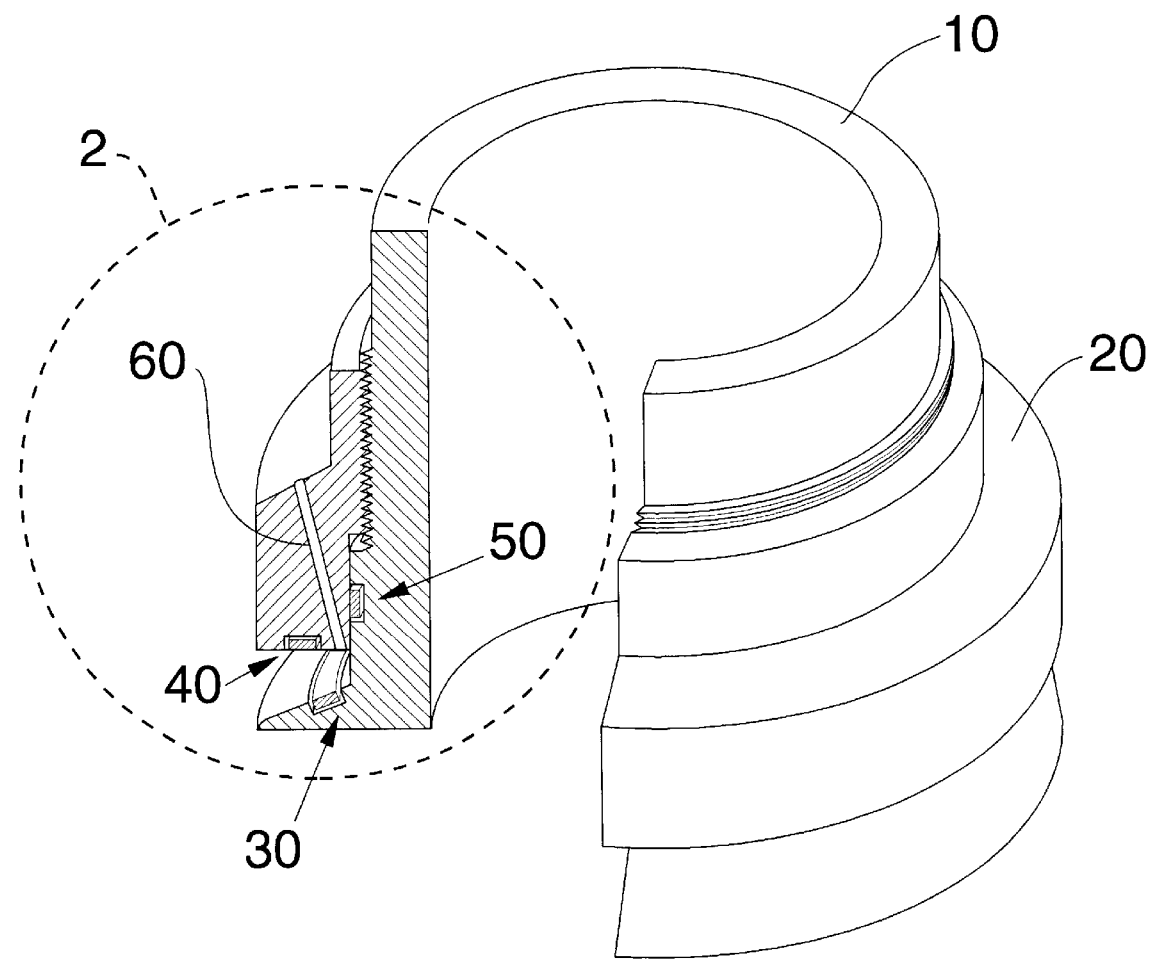
FIG. 1 represents both an isometric view of the invention and a partial, cross-sectional view of the invention.

Referring to FIG. 1, a preferred embodiment of this invention comprises a tube (10), a collar (20), a first seal (30), a second seal (40), a third seal (50), and a port (60).

Figure 2:
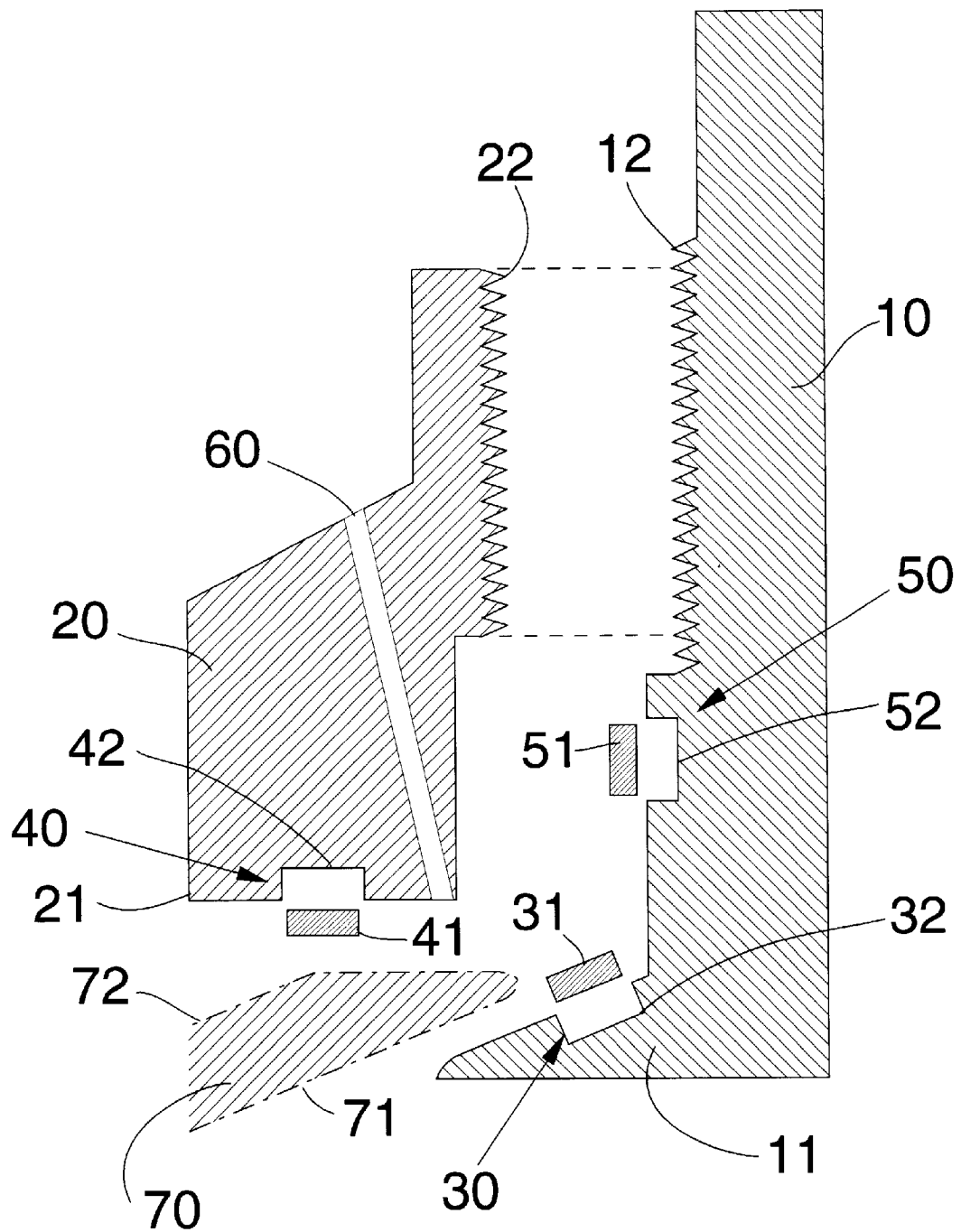
FIG. 2 resents an expanded enlargement of the invention taken from section 2 of FIG. 1.

Referring to FIG. 2, the tube (10) has a flange (11) at one end and male threads (12) at the other end. The flange (11) on the tube (10) can be tapered to match the cross-sectional shape of the pressure vessel. The collar (20) also has a flange (21) at one end and female threads (22) at the other end corresponding to the male threads (12) of the tube (10). The flange (21) on the collar (20) can also be shaped, if necessary, to accommodate the cross-sectional shape of the pressure vessel.

Referring to both FIGS. 1 and 2, the first seal (30) is located on the flange (11) of the tube (10). In the preferred embodiment, the first seal consists of a first 0-ring gasket (31) located in a first groove (32) on the flange (11).

The second seal (40) is located on the flange (21) of the collar (20). In the preferred embodiment, the second seal consists of a second O-ring gasket (41) located in a second groove (42) on the flange (21).

The third seal (50) is located on the tube (10) between the male threads (12) and the flange (11). In the preferred embodiment, the third seal consists of a third O-ring gasket (51) located in a third groove (52) on the tube (10). Alternatively, under appropriate conditions, the mated threads (12, 21) of the tube (10) and the collar (20) could function as the third seal.

The port (60) is strategically located in the collar (20) in order to provide access to the area that is confined by the first seal (30), the second seal (40), and the third seal (50).

The operation of the invention is straightforward. The tube is placed in an opening of a pressure vessel (shown as 70 in FIG. 2) such that the flange on the tube bears against the interior surface (71) of the pressure vessel. The collar is then threaded onto the tube such that the flange on the collar bears against the exterior surface (72) of the pressure vessel. The wall of the pressure vessel is compressed between the flange on the tube and the flange on the collar. The first O-ring, which is compressed between the flange on the tube and the interior surface of the pressure vessel, is the primary means for preventing leakage. However, the second and third O-rings, acting as secondary seals, restrain any leakage past the first O-ring. The second O-ring prevents leakage between the collar and the exterior surface of the pressure vessel and the third O-ring prevents leakage through the threads. The port allows the O-rings to be pressurized and seated before the pressure vessel becomes pressurized. This pre-pressurization procedure is beneficial when the seals will be exposed to extreme temperature conditions (e.g., cryogenic temperatures).

The foregoing functional description assumes that a connecting pipeline is attached to the tube such that the first O-ring functions as a primary seal and the second and third O-rings function as secondary seals (i.e., back-up seals for leakage past the primary seal). If the connecting pipeline is attached to the collar rather than the tube, the first and third O-rings are exposed to the interior pressure and function as primary seals and the second O-ring functions as the only secondary seal. Thus, it is possible for the preferred embodiment to function in two different ways depending on whether the connecting pipeline is attached to the tube or the collar.

What is claimed is:

1. An apparatus, comprising:

a tube having a flange at one end and threads at another end, said flange having a first seal;

a collar having a flange at one end and threads at another end, said collar is threadably mounted on said threads of said tube, said collar having a second seal;

a third seal located between said tube and said collar adjacent to said threads on said tube and said collar; and a port located in said collar for pressurizing the area among said first seal, said second seal, and said third seal.

2. An apparatus as recited in claim 1, wherein said primary seal consists of a first O-ring gasket positioned within a first groove on said flange of said tube.

3. An apparatus as recited in claim 1, wherein said second seal consists of a second O-ring gasket positioned within a second groove on said flange of said collar.

4. An apparatus as recited in claim 1, wherein said third seal consists of a third O-ring gasket positioned within a third groove on said tube adjacent to said threads.

5. An apparatus as recited in claim 1, wherein said flange on said tube is tapered.

* * * * *